US009454465B1

(12) United States Patent
Jhoney et al.

(10) Patent No.: US 9,454,465 B1
(45) Date of Patent: Sep. 27, 2016

(54) RISK BASED PROFILES FOR DEVELOPMENT OPERATIONS

(71) Applicant: International Business Machines Corporation, Armonk, NY (US)

(72) Inventors: Albee Jhoney, Bangalore (IN); Mahantesh S. Meti, Bangalore (IN); Kalpesh Sharma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/967,931

(22) Filed: Dec. 14, 2015

(51) Int. Cl.
G06F 11/00 (2006.01)
G06F 11/36 (2006.01)
G06F 9/445 (2006.01)

(52) U.S. Cl.
CPC ............. G06F 11/3672 (2013.01); G06F 8/60 (2013.01)

(58) Field of Classification Search
USPC ....................................................... 714/38.12
See application file for complete search history.

(56) References Cited

U.S. PATENT DOCUMENTS

| 7,529,181 | B2* | 5/2009 | Yardeni | H04L 41/0631 370/216 |
| 7,536,724 | B1* | 5/2009 | Sobel | G06F 21/577 726/25 |
| 8,819,632 | B2* | 8/2014 | Williams | G06F 11/0766 714/38.14 |
| 8,875,091 | B1* | 10/2014 | Rouleau | G06F 8/10 717/101 |
| 8,904,241 | B2* | 12/2014 | Srivastava | G06F 8/10 714/47.1 |
| 2013/0219361 | A1* | 8/2013 | Fiebig | G06F 8/70 717/121 |
| 2013/0282895 | A1 | 10/2013 | Ko et al. | |
| 2014/0317591 | A1* | 10/2014 | Rosomoff | G06F 8/70 717/101 |
| 2015/0199197 | A1* | 7/2015 | Maes | G06F 8/71 717/122 |
| 2015/0248301 | A1* | 9/2015 | Shani | G06F 8/60 717/163 |

OTHER PUBLICATIONS

Continuous Delivery, "Continuous Delivery and ITIL: Change Management", http://continuousdelivery.com/2010/11/continuousdeliveryanditilchangemanagement/, printed on Jun. 4, 2015, pp. 1-3.
Mell et al., "The NIST Definition of Cloud Computing", National Institute of Standards and Technology, Special Publication 800-145, Sep. 2011, 7 pages.

* cited by examiner

*Primary Examiner* — Kamini Patel
(74) *Attorney, Agent, or Firm* — Reza Sarbakhsh; Michael A. Petrocelli

(57) ABSTRACT

A method, computer program product, and system for risk monitoring of continuous software delivery include a first plurality of test data. The first plurality of test data is associated with one or more software components. In response to receiving a changelog, a change in the received plurality of test data is determined. A risk profile for the one or more software components is generated, in response to receiving the first plurality of test data and the received changelog. A component code graph is generated, based on the risk profile associated with the one or more software components and a risk value associated with the generated risk profile is calculated, based on the component code graph.

14 Claims, 6 Drawing Sheets

RISK BASED PROFILES FOR DEVELOPMENT OPERATIONS

BACKGROUND

The present invention relates generally to the field of risk management, and more particularly to risk profiles associated with software components in a development operation.

As a part of the continuous delivery (CD) process in a development operation (DevOps), development team continuously fix defects & release new features to staging & eventually to production. The DevOps team have to manage updates, test updates and maintain awareness of any issues reported from the field. The engineers in the DevOps team may depend on metrics, events, and logs collected by a monitoring system to predict, detect, isolate, and resolve issues in the software.

In order to reduce risk of failure, the DevOps team may use a monitoring system to increase the quality & quantity of the data collected (metrics, events, logs), by increasing the frequency of data collection or depth of data collected (information and trace messages in addition to error, warning messages); however, this may impact the overall performance of the system.

The DevOps team typically makes a trade-off between performance & risk factors. Manually manipulation of the monitoring system at different points in time, may allow the DevOps team to support the subject application or service. It may arise, however, that high risk components are not monitored sufficiently, as well as low-risk components under aggressive monitoring.

SUMMARY

Embodiments of the present invention disclose a method, computer program product, and system for risk monitoring of continuous software delivery. A first plurality of test data is received, the first plurality of test data being associated with one or more software components. In response to receiving a changelog, a change in the received plurality of test data is determined. A risk profile for the one or more software components is generated, in response to receiving the first plurality of test data and the received changelog. A component code graph is generated, based on the risk profile associated with the one or more software components and a risk value associated with the generated risk profile is calculated, based on the component code graph.

DETAILED DESCRIPTION

Figure 1:
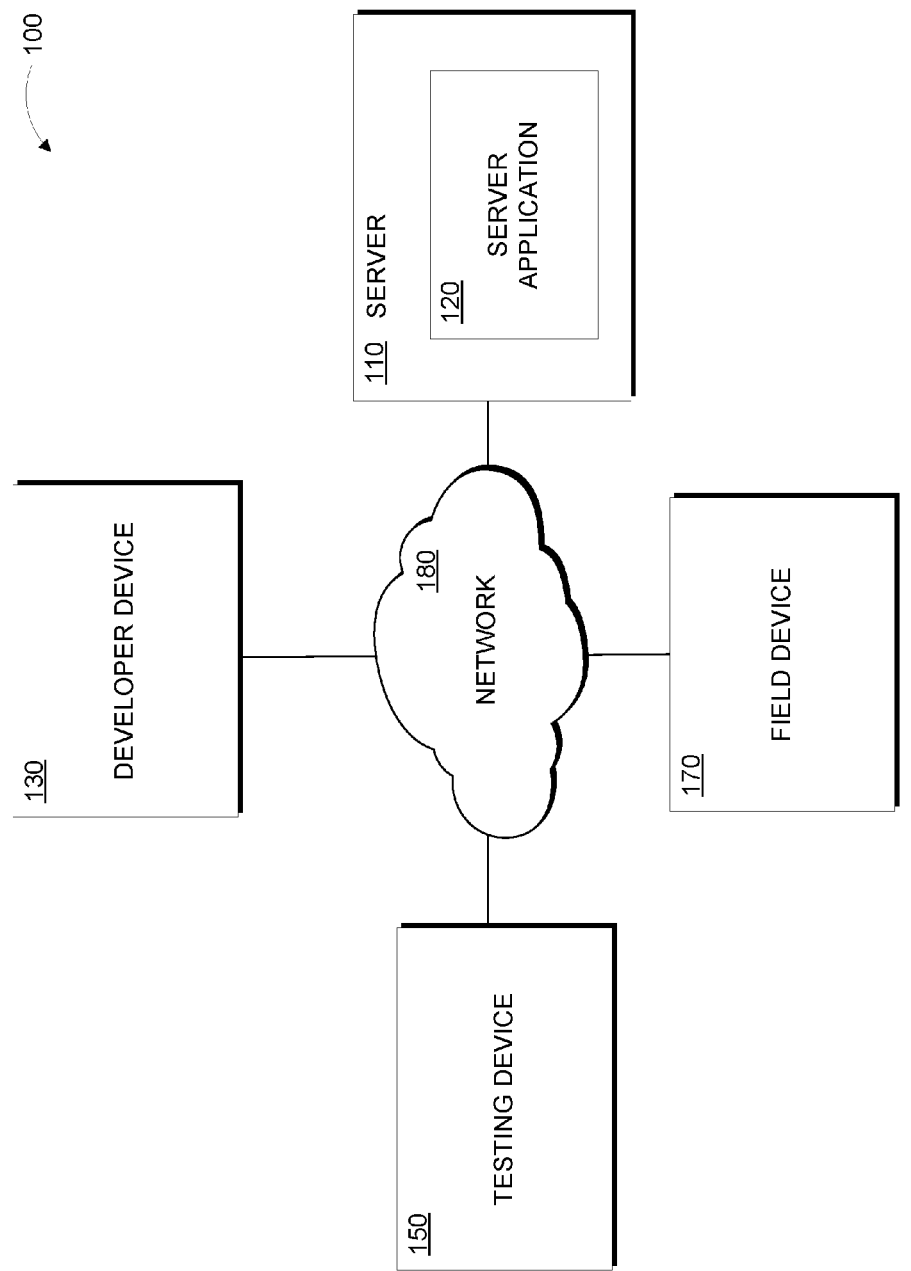
FIG. 1 is a functional block diagram illustrating a distributed data processing environment, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention will now be described in detail with reference to the Figures. Referring to FIG. 1, a functional block diagram illustrating a distributed data processing environment, generally designated 100, is shown, in accordance with one embodiment of the present invention. Distributed data processing environment 100 includes server 110, developer device 130, testing device 150 and field device 170, interconnected through network 180.

Network 180 may include permanent connections, such as wire or fiber optic cables, or temporary connections made through telephone or wireless communications. Network 180 may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Network 180 may also include a number of different types of networks, such as, for example, an intranet, a local area network (LAN), or a wide area network (WAN).

Each of server 110, developer device 130, testing device 150, and field device 170 may be a laptop computer, tablet computer, netbook computer, personal computer (PC), desktop computer, smart phone, or any programmable electronic device capable of an exchange of data packets with other electronic devices, for example, through a network adapter, in accordance with an embodiment of the invention, and which may be described generally with respect to FIG. 4 below. In various embodiments, server 110 may be a separate server or series of servers, a database, or other data storage, internal or external to developer device 130, testing device 150, and field device 170, of distributed data processing environment 100.

Figure 2:
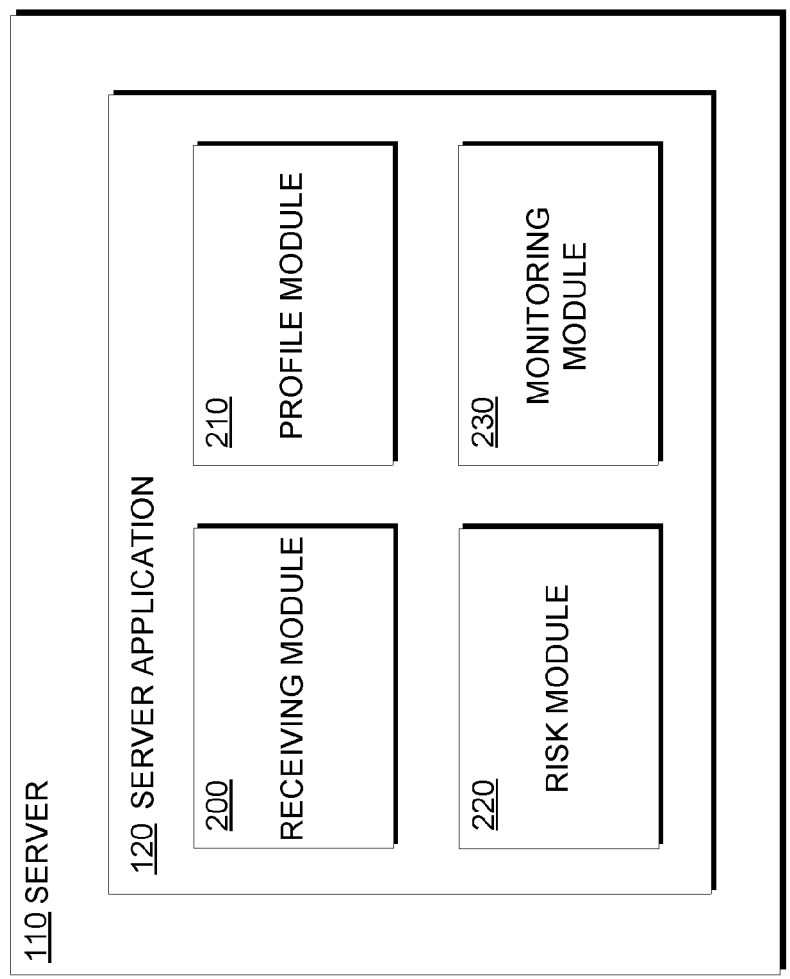
FIG. 2 is a functional block diagram illustrating the components of an application within the distributed data processing environment, in accordance with an embodiment of the present invention.

Server 110 includes server application 120, as described in more detail in reference to FIG. 2. In various embodiments, server 110 operates generally to receive a plurality of data associated with one or more software components, for example, software artifacts, determine a change in the received data and recording the change in received data, generate risk profiles for each software components, generates a component code graph, calculated and assigns a risk value to each generated risk profile, and dynamically adjusts the risk value based on received new data. Server 110 may host applications, for example, server application 120, which may process and/or store data received via server 110. In various embodiments, received data, or software artifacts, may include development artifacts, test artifacts, and/or field data artifacts.

Developer device 130 operates generally to generate and communicate development artifacts to server application 120 via server 110. In various embodiments, development artifacts may include, for example, software code from reverse engineering or development configurations for various software components. In various embodiments developer device 130 may generate a code component graph which represents all code associated with a particular component. Code generated on developer device 130 may change, and those changed may generate logs, for example, build logs or changelogs. Build logs may trigger an annotation in the generated component code graph. Developer device 130 may communicate data associated with components, component code graph data, and/or change logs to server application 120 via server 110 or testing device 150.

Testing device 150 operates generally to receive code and component data, and generate and communicate test artifacts to server application 120 via server 110. In various embodiments, testing device 150 may receive code and component data from developer device 130. Testing device 150 may perform various functional verification testing (FVT) on received code and generate test artifacts. Test artifacts may be, for example, log-adjacency-changes configuration command instructions that generate log sequence or log messages that indicate software failures. Testing device 150 may generate a failure or defect history based on the log messages indicating failures and associate log messages with received components. Failure history, associated with various components, may be communicated to server application 120 via server 110 or field device 170.

Field device 170 operates generally to receive failure logs associated with software components and generate and communicate operation or field data artifacts to server application 120 via server 110. In various embodiments field device 170 may receive failure log data and associated component data from testing device 150. In various embodiments, field device 170 may generate incident data, which correlate the incidence of failure of a component with the component that caused the failure. In various embodiments, field device 170 may perform natural language data mining of social media and analyze social media websites for comments indicating failures or performance issues of any of the logged components. Field device 170 may communicate incident data and/or social media comments to server application 120, via server 110 through network 180.

Network 180 can be, for example, a local area network (LAN), a wide area network (WAN) such as the Internet, or a combination of the two, and can include wired, wireless, or fiber optic connections. In general, network 180 can be any combination of connections and protocols that will support communications between server 110, developer device 130, testing device 150, and field device 170.

Referring to FIG. 2, a functional block diagram illustrating the components of server application 120 is shown, within distributed data processing environment 100, in accordance with an embodiment of the present invention. Server application 120 includes receiving module 200, profile module 210, risk module 220, and monitoring module 230.

Receiving module 200 operated generally to receive software artifacts and related data, analyze received data, and communicate analyzed data to profile module 210. In various embodiments, receiving module 200 may receive code with associated component data, component-code graph data, failure histories, incident data, and/or social media comments. In various embodiments, receiving module 200 may receive code with associated component data and component-code graph data from developer device 130, failure histories or failure logs, from testing device 150, and incident data, and/or social media comments from field device 170. Receiving module 200 may determine received data that meets a risk criteria, in various embodiments the risk criteria is predetermined or procedurally generated by receiving module 200 by analyzing the received data using natural language analysis. Data that meets a risk criteria may be stored in memory or communicated to profile module 210 for further processing. Receiving module 200 may periodically check for new data or new risk criteria in order to dynamically determine if received data meets risk criteria to be communicated to profile module 210.

Profile module 210 operates generally to receive data, generate risk profiles associated with one or more components, and communicate data and/or generated profiles. In various embodiments, profile module 210 may receive code with associated component data, component-code graph data, failure histories, incident data, and/or social media comments from receiving module 200, which meet a risk criteria. Profile module 210 may generate a risk profile for each component that is associated with received data. In various embodiments, the risk profile may include, for example, metrics from the received component-code graph data, where the higher the level of component-code dependency the higher the risk.

In various embodiments, received code with an associated change may be included in the generated risk profile, for example, the more changes in determined in the received code, the higher the risk. Profile module 210 may also include failure histories in which the length or nature of the failure history may increase or decrease the risk associated with that component. Profile module 210 may analyze incident data in order to determine if the incidence associated with a component is above a frequency threshold and profile module 210 may increase the risk associated with that profile. In various embodiments, the frequency threshold may be predetermined or calculated my profile module 210, based on previous profiles histories, or another module within or without server application 120. Profile module 210 may use natural language analysis to analyze received comments and determine the negative sentiment value of the received comments. If the sentiment of received comments is above a threshold value, profile module 210 may associate an increased risk with that profile. Generated profiles and associated risk may be communicated to risk module 220.

Risk module 220 operates generally to receive risk profiles and determine a risk value for receive risk profiles. For example, risk values may be low, medium, or high. Risk values may increase the efficiency of monitoring software components, as developers may focus on components with higher risk values. Risk module 220 may receive a risk profile generated by profile module 210. In various embodiments, risk module 220 may determine a risk value of high, medium, or low for each received risk profile. The risk value determination may be based on separate predetermined thresholds of risk associated with each risk value or level. A high risk value may have a relativity higher associated risk threshold than a medium risk value, which may have a relatively higher associated risk threshold than a low risk value. Determined risk values and received risk profiles may be indexed and stored in memory or communicated to monitoring module 230.

Monitoring module 230 operates generally to receive risk profiles and associated risk values, monitor components associated with received risk profiles, and update risk profile values. For example, monitoring module 230 may receive a risk profile with a risk value of "high." For the associated component of the high risk profile, monitoring module 230 may communicate with testing device 150 to set the log collection to "fine." Fine log collection may collect every instance of the component, for example, when traces are run, debugging is performed, configurations are changed, information is added, or warning, error and fatal messages are generated. Monitoring module 230 may set log collection to be "aggressive." Aggressive log collection may be a short periodic collection, for example, every 2 minutes, or in various embodiments, continuous collection. It should be appreciated that the time frame of collection described above is exemplary and should not be interpreted as limiting. Monitoring module 230 may communicate to developer device 130 to set metric collection to aggressive. Aggressive metric collection may include data collection of all attributes of the component as well as all vertically dependent components, for example, dependent middleware, operating systems, etc. The time frame for metric collection may be set as aggressive as well, for example 5 minute intervals, or continuous collection. These aggressive settings set by monitoring module 230 may increase the attention a component received from a developer and warning messages and failure notifications may be generated at an increased frequency by, for example, testing device 150 based on failure logs or other data.

In various embodiments, monitoring module 230 may receive a risk profile with a medium associated risk value. For a medium risk value, monitoring module 230 may communicate a log collection setting, as described above, to "informational." An informational log collection may, for example, only collect warning, error, and fatal messages. The interval for collection may be set as "normal." In various embodiments, a normal collection setting may be any time interval longer than an aggressive time interval, for example, every 5 minutes. Monitoring module 230 may communicate to developer device 130 to set metric collection to normal. In various embodiments, normal metric collection may be only the collection of a predetermined subset of metrics of the metrics capable of being monitored. Monitoring module 230 may set a metric collection interval of normal, where a normal collection interval is longer than an aggressive collection interval, for example every 10 minutes.

In various embodiments, monitoring module 230 may receive a risk profile with a low associated risk value. For a low risk value, monitoring module 230 may communicate a log collection setting, as described above, to be set as "warning", where, for example, only fatal messages are collected. The interval for log collection may be on demand or manual, where no periodic collection is performed, or a time interval longer than normal, for example every 10 minutes. Monitoring module 230 may communicate to developer device 130 to set metric collection to "minimal." In various embodiments, minimal metric collection may only be a selection from the subset of metrics used in normal metric collection. The interval for metric collection may be on demand or manual, where no periodic collection is performed, or a time interval longer than normal, for example every 15 minutes.

Monitoring module 230 may periodically query developer device 130, testing device 150, and field device 170 for updates or changes in data, receive new data from various devices and update the risk value of received profiles. A change in the risk value of a risk profile may change the log collection, metric collection, and associated collection intervals to match the new risk value of the risk profile.

Figure 3:
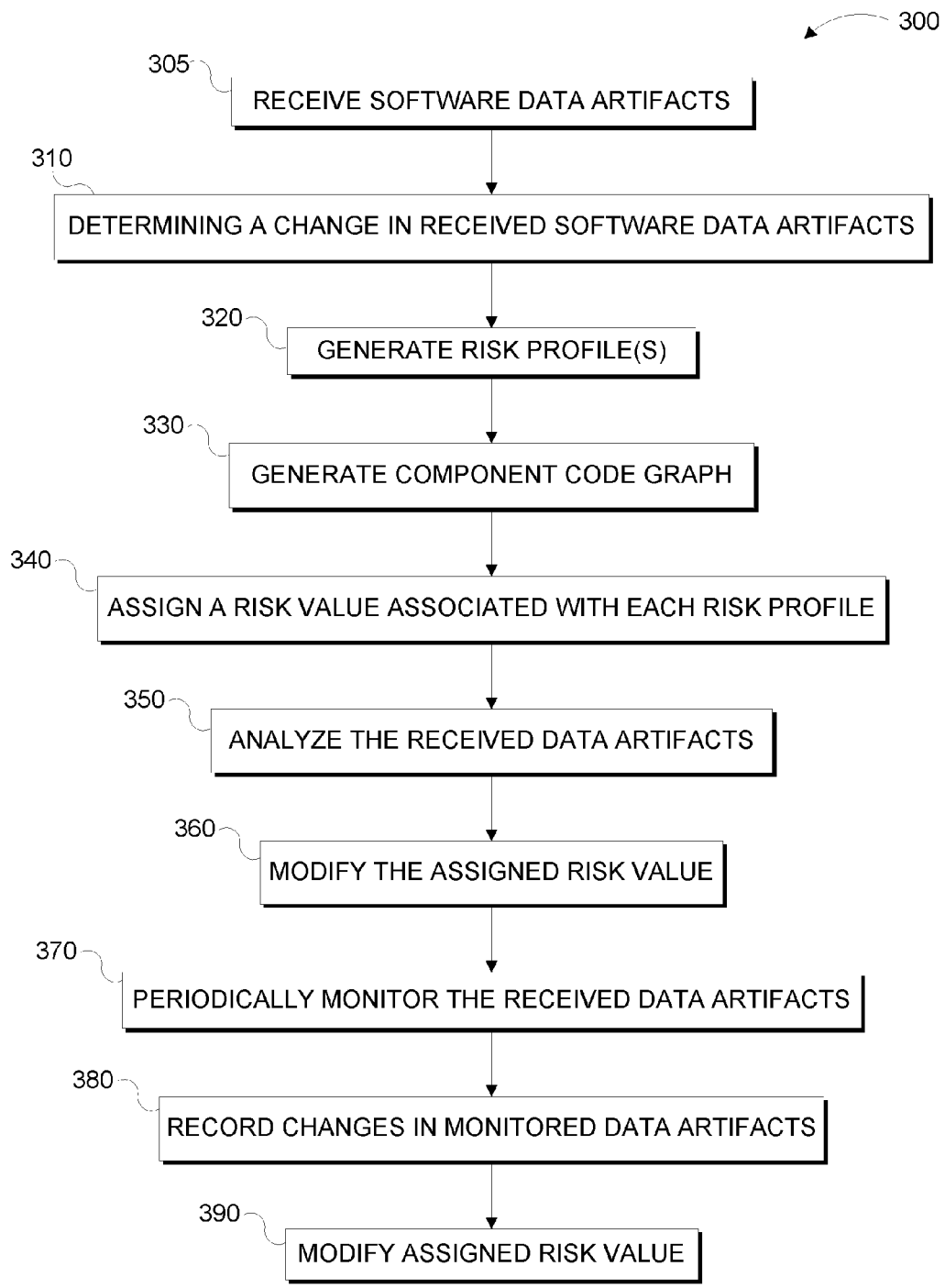
FIG. 3 is a flowchart depicting operational steps of an application, on a server computer within the data processing environment of FIG. 1, in accordance with an embodiment of the present invention.

Referring to FIG. 3, a method 300 depicts the operational steps of server application 120, on server 110 within the data processing environment. Referring now to FIGS. 1, 2, and 3, in step 305, receiving module 200 receives software data artifacts, or a plurality or data, via sever application 120. Software data artifacts may include component-code dependency graph data, code change data, component data, failure histories or logs, incident data, and/or social media comments. Receiving module 200 may receive a subsequent set of data with changes relative to the first set and determine and index changes in received data, in step 310. Receiving module 200 communicated received data to profile module 210 and profile module 210 generates risk profiles based on the received data, in step 320, as described above. In various embodiments, a component code graph is generated, in step 330, based on the component and code data received by receiving module 200. The component code graph may contain nodes based on the software modules or components in which data was received and directional vertices based on an amount of code value that represents the strength of the components dependency on the code. In various embodiments the component code graph may be an undirected tree graph.

Profile module 210 communicates generated risk profiles and/or the generated component code graph to risk module 220 and risk module 220 assigns a risk value to each received risk profile based on the associated communicated data, in step 340, as descried above. Risk module 220 communicates risk profiles with assigned risk values and received data to monitoring module 230 and monitoring module 230 analyzes the received data, in step 350, and communicated settings to developer device 130, testing device 150, and field device 170 associated with the risk level, as described above.

Monitoring module 230 modifies the assigned risk value, in step 360, in response to receiving additional data from developer device 130, testing device 150, and field device 170. Monitoring module 230 periodically queries or monitors developer device 130, testing device 150, and field device 170 for changes in the received data, in step 370. Monitoring module 230 records and changes determined in the received data, in step 380, and in response, modifies the assigned risk value associated with the risk profile in which there was recorded changed data, in step 390. In various embodiments, monitoring module 230 may continue to periodically query for changes in received data and continuously modify the risk value associated with received risk profiles generated by profile module 210. This continuous modification may enable developers to take advantage of the dynamic risk values to focus on one component or another based on the risk value of the associated risk profile of that component.

Figure 4:
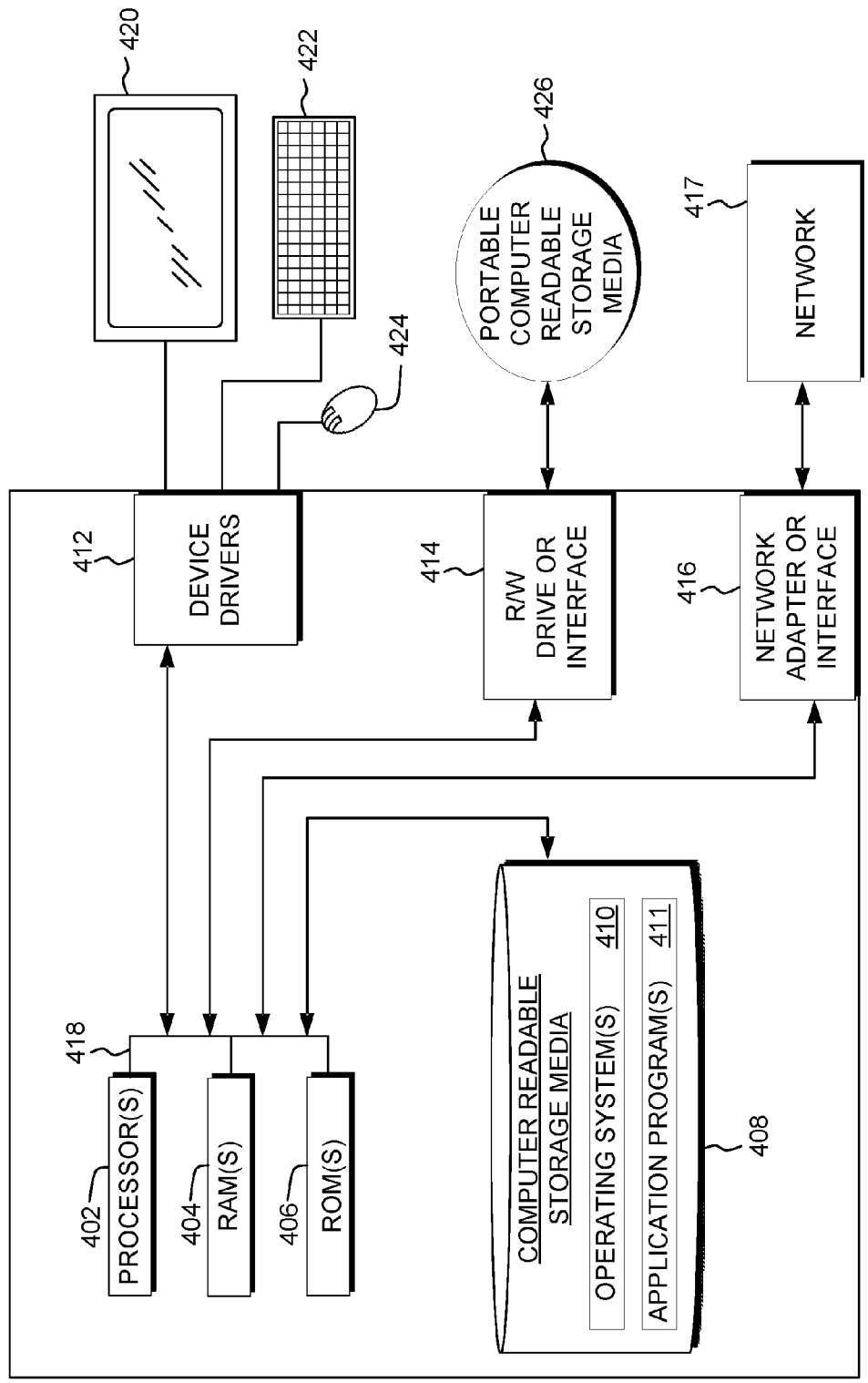
FIG. 4 depicts a block diagram of components of the server computer executing an application, in accordance with an embodiment of the present invention.

Referring to FIG. 4, a block diagram of components of a computing device of distributed data processing environment 100 of FIG. 1 is depicted, for example, server 110, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Server 110 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, server application 120, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 110 may also include a R/W drive or interface 414 to read from and write to one or more portable computer readable storage media 426. Application programs 411 on server 110 may be stored on one or more of the portable computer readable storage media 426, read via the respective R/W drive or interface 414 and loaded into the respective computer readable storage media 408.

Server 110 may also include a network adapter or interface 416, such as a TCP/IP adapter card or wireless communication adapter (such as a 4G wireless communication adapter using OFDMA technology) for connection to a network 417. Application programs 411 on server 110 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Server 110 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

Figure 5:
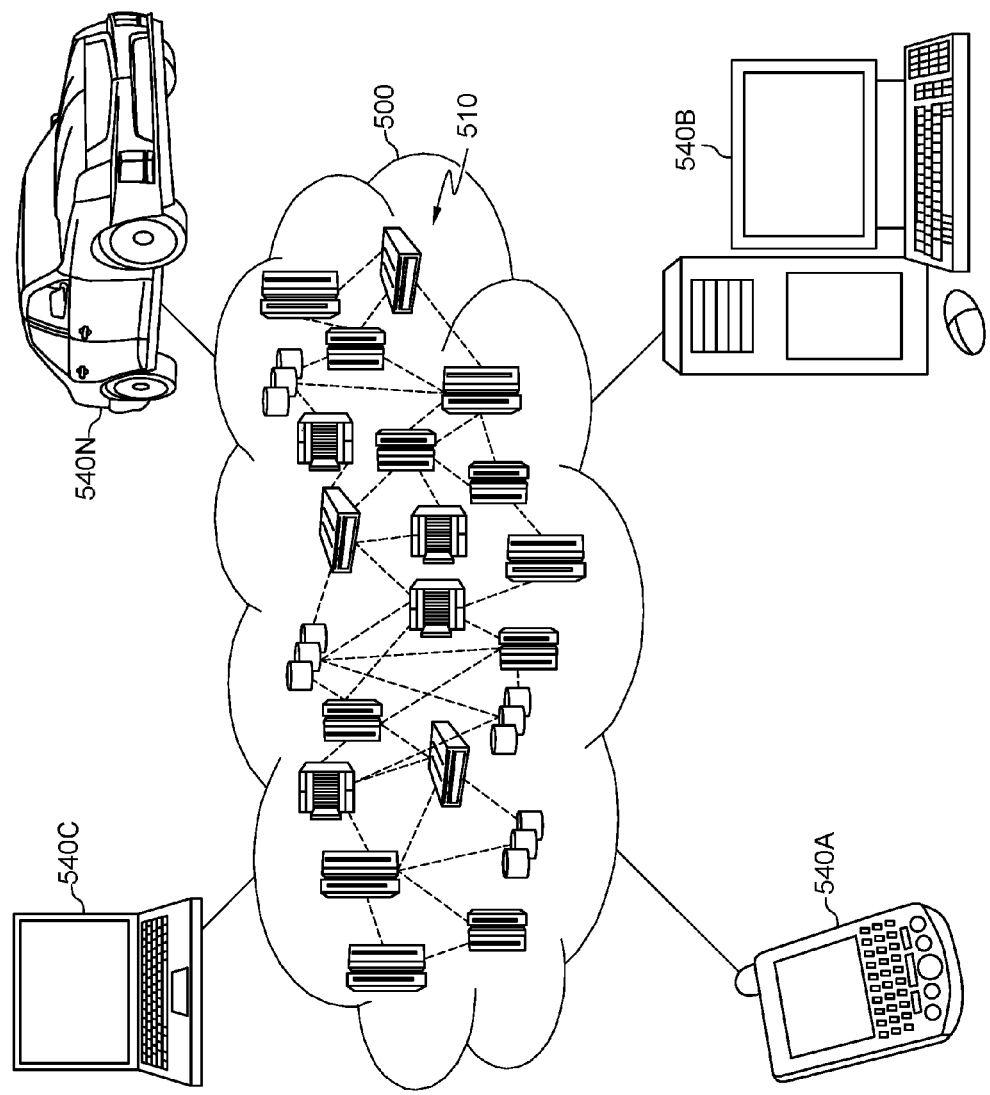
FIG. 5 is a schematic block diagram of an illustrative cloud computing environment, according to an aspect of the present invention.

Referring now to FIG. 5, an illustrative cloud computing environment 500 is depicted. As shown, cloud computing environment 500 comprises one or more cloud computing nodes 510 with which local computing devices used by cloud consumers, such as, for example, personal digital assistant (PDA) or cellular telephone 540A, desktop computer 540B, laptop computer 540C, and/or automobile computer system 540N may communicate. Computing nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 540A-N shown in FIG. 5 are intended to be illustrative only and that computing nodes 510 and cloud computing environment 500 can communicate with any type of computerized device over any type of network and/or network addressable connection (e.g., using a web browser).

Figure 6:
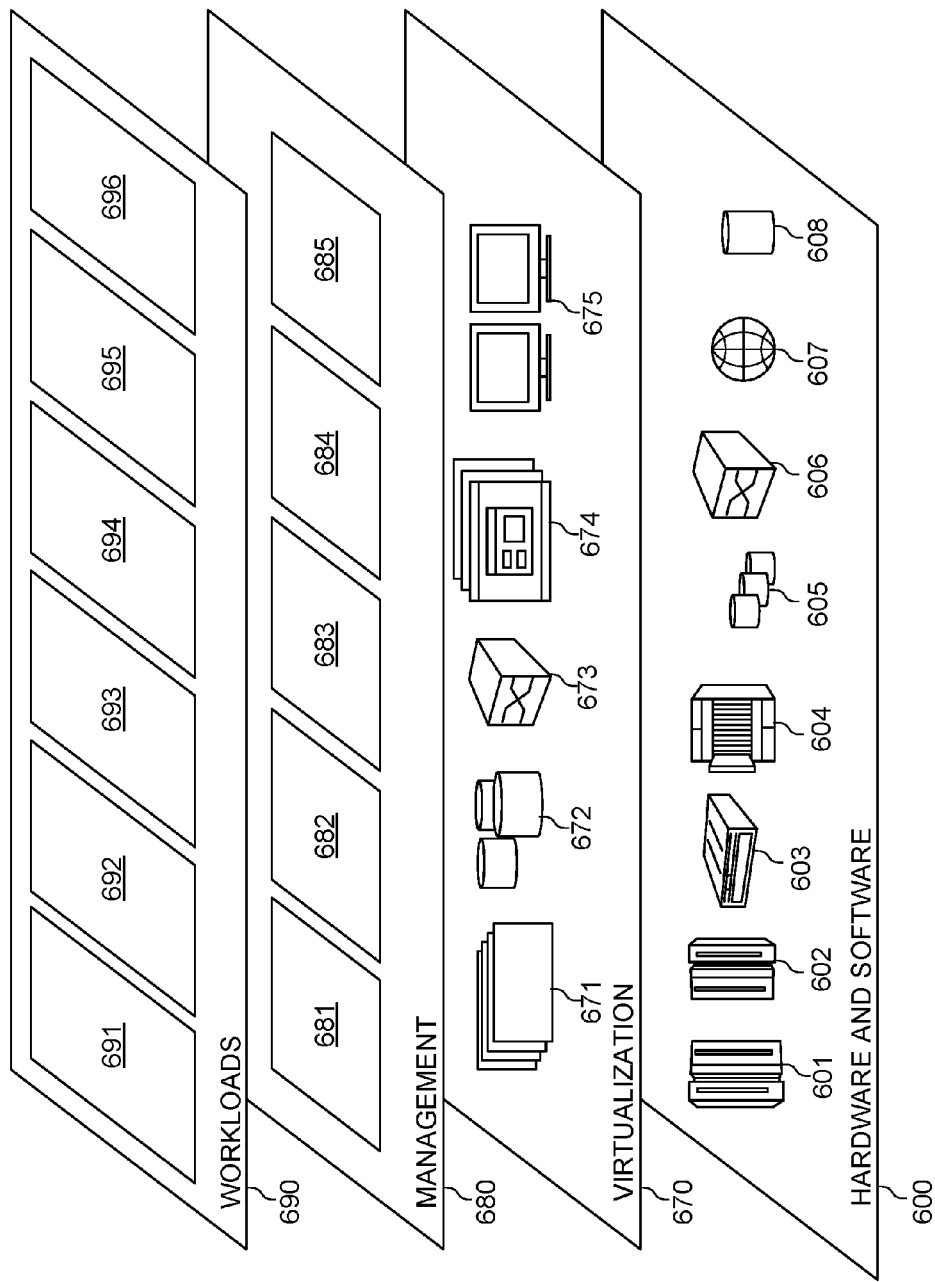
FIG. 6 is a multi-layered functional illustration of the cloud computing environment of FIG. 5, according to an embodiment of the present invention.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 600 includes hardware and software components. Examples of hardware components include: mainframes 601; RISC (Reduced Instruction Set Computer) architecture based servers 602; servers 603; blade servers 604; storage devices 605; and networks and networking components 606. In some embodiments, software components include network application server software 607 and database software 608.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and risk management processing 696.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer implemented method for risk monitoring of continuous software delivery, comprising:
   receiving a first plurality of test data, the first plurality of test data being associated with one or more software components;
   in response to receiving a changelog, determining a change in the received plurality of test data;
   generating a risk profile for the one or more software components, in response to receiving the first plurality of test data and the received changelog;
   generating a component code graph, based on the risk profile associated with the one or more software components;
   calculating a risk value associated with the generated risk profile, based on the component code graph;
   analyzing the plurality of test data associated with one or more risk profiles;
   modifying the assigned risk value in response to the analyzed pluralities of test data;
   periodically monitoring received plurality of data for an additional change;
   recording the subsequent change;
   modifying the generated risk profile based on the recorded subsequent change;
   modifying the assigned risk value, based on the modified generated risk profile;
   receiving a monitoring setting associated with each risk value; and
   executing the monitoring setting associated with the risk value associated with the one or more risk profiles associated with the one or more software components.

2. The method of claim 1, further comprising:
   dynamically adjusting the risk value, in response to receiving a second plurality of test data.

3. The method of claim 1, wherein the component code graph further comprises:
   a plurality of nodes, based on the one or more software components; and
   a plurality of directional vertices, based on dependent code associated with the one or more software components.

4. The method of claim 1, wherein the plurality of test data includes one or more of:
   a first subset of the plurality of test data, associated with software development;
   a second subset of the plurality of test data, associated with software testing; and
   a third subset of the plurality of test data, associated with software operations.

5. The method of claim 1, wherein the risk profile includes a timestamp.

6. A computer program product for risk monitoring of continuous software delivery, the computer program product comprising:
   one or more computer-readable storage media and program instructions stored on the one or more computer-readable storage media, the program instructions comprising:
   instructions to receive a first plurality of test data, the first plurality of test data being associated with one or more software components;
   in response to instructions to receive a changelog, instructions to determine a change in the received plurality of test data;
   instructions to generate a risk profile for the one or more software components, in response to receiving the first plurality of test data and the received changelog;
   instructions to generate a component code graph, based on the risk profile associated with the one or more software components;
   instructions to calculate a risk value associated with the generated risk profile, based on the component code graph;
   instructions to analyze the plurality of test data associated with one or more risk profiles;
   instructions to modify the assigned risk value in response to the analyzed pluralities of test data;
   instructions to periodically monitor received plurality of data for an additional change;
   instructions to record the subsequent change;
   instructions to modify the generated risk profile based on the recorded subsequent change; and
   instructions to modify the assigned risk value, based on the modified generated risk profile;
   instructions to receive a monitoring setting associated with each risk value; and
   instructions to execute the monitoring setting associated with the risk value associated with the one or more risk profiles associated with the one or more software components.

7. The computer program product of claim 6, further comprising:
   instructions to dynamically adjust the risk value, in response to instructions to receive a second plurality of test data.

8. The computer program product of claim 6, wherein the component code graph further comprises:
   a plurality of nodes, based on the one or more software components; and
   a plurality of directional vertices, based on dependent code associated with the one or more software components.

9. The computer program product of claim 6, wherein the plurality of test data includes one or more of:
   a first subset of the plurality of test data, associated with software development;
   a second subset of the plurality of test data, associated with software testing; and
   a third subset of the plurality of test data, associated with software operations.

10. The computer program product of claim 6, wherein the risk profile includes a timestamp.

11. A computer system for risk monitoring of continuous software delivery, the computer system comprising:
   one or more computer processors;
   one or more computer-readable storage media;
   program instructions stored on the computer-readable storage media for execution by at least one of the one or more processors, the program instructions comprising:

instructions to receive a first plurality of test data, the first plurality of test data being associated with one or more software components;
in response to instructions to receive a changelog, instructions to determine a change in the received plurality of test data;
    instructions to generate a risk profile for the one or more software components, in response to receiving the first plurality of test data and the received changelog;
    instructions to generate a component code graph, based on the risk profile associated with the one or more software components;
    instructions to calculate a risk value associated with the generated risk profile, based on the component code graph;
    instructions to analyze the plurality of test data associated with one or more risk profiles;
    instructions to modify the assigned risk value in response to the analyzed pluralities of test data;
    instructions to periodically monitor received plurality of data for an additional change;
    instructions to record the subsequent change;
    instructions to modify the generated risk profile based on the recorded subsequent change;
    instructions to modify the assigned risk value, based on the modified generated risk profile;
    instructions to receive a monitoring setting associated with each risk value; and
    instructions to execute the monitoring setting associated with the risk value associated with the one or more risk profiles associated with the one or more software components.

12. The system of claim 11, further comprising:
instructions to dynamically adjust the risk value, in response to instructions to receive a second plurality of test data.

13. The system of claim 11, wherein the component code graph further comprises:
    a plurality of nodes, based on the one or more software components; and
    a plurality of directional vertices, based on dependent code associated with the one or more software components.

14. The system of claim 11, wherein the plurality of test data includes one or more of:
    a first subset of the plurality of test data, associated with software development;
    a second subset of the plurality of test data, associated with software testing; and
    a third subset of the plurality of test data, associated with software operations.

* * * * *